(12) United States Patent
McLaughlin et al.

(10) Patent No.: US 8,495,398 B2
(45) Date of Patent: Jul. 23, 2013

(54) INFORMATION HANDLING SYSTEM REMOTE INPUT/OUTPUT CONNECTION SYSTEM

(75) Inventors: Robyn Reed McLaughlin, Austin, TX (US); Douglas Evan Messick, Austin, TX (US); Jason Alan Shepherd, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 444 days.

(21) Appl. No.: 12/847,346

(22) Filed: Jul. 30, 2010

(65) Prior Publication Data

US 2012/0030455 A1    Feb. 2, 2012

(51) Int. Cl.
   *G06F 1/00*    (2006.01)
(52) U.S. Cl.
   USPC ........... 713/310; 713/300; 710/300; 710/301; 710/303; 710/306; 710/313
(58) Field of Classification Search
   USPC ................. 713/300, 310; 710/300, 301, 303, 710/306, 313
   See application file for complete search history.

(56) References Cited

U.S. PATENT DOCUMENTS

| | | | |
|---|---|---|---|
| 5,767,844 A | 6/1998 | Stoye | |
| 5,948,092 A | 9/1999 | Crump et al. | |
| 6,963,984 B2 * | 11/2005 | Shiga | 713/310 |
| 7,134,027 B2 * | 11/2006 | Calhoon | 713/300 |
| 7,139,165 B2 * | 11/2006 | Sharma et al. | 361/679.02 |
| 7,417,850 B1 * | 8/2008 | Pulido | 361/679.01 |
| 2005/0060467 A1 * | 3/2005 | Wieck | 710/303 |
| 2007/0214297 A1 * | 9/2007 | Gilbert | 710/100 |
| 2011/0320655 A1 * | 12/2011 | Dorogusker et al. | 710/105 |

OTHER PUBLICATIONS

"Help with Extending Laptop Docking Station's Power Button", Apr. 12, 2003, mp3car.com, <http://www.mp3carcom/general-hardware-discussion/13813-help-with-extending-laptop-docking-stations-power-button.html>.*
Wu, Shuguang, Methods for Providing Power to an Information Handling System, filed on Aug. 25, 2009, U.S. Appl. No. 10/547,470.

* cited by examiner

*Primary Examiner* — Jaweed A Abbaszadeh
(74) *Attorney, Agent, or Firm* — Haynes and Boone, LLP

(57) ABSTRACT

An information handling system (IHS) remote input/output (I/O) connection system includes an enclosure having a power button, a communication bus connection point, and an audio connection point. A cable dongle extends from the enclosure. The cable dongle has a first end and a second end. The cable dongle also includes a connection from the power button on the enclosure on the first end to a communication connection point plug on the second end, which mates with a connection point plug on a remote I/O device card that enables a parallel (ACPI) S5-capable power button from the IHS to exist on the enclosure. The cable dongle further includes a communication cable coupled to the communication bus connection point on the first end and having a communication connection point plug on the second end. In addition, the cable dongle includes an audio cable coupled to the audio connection point on the first end and having an audio connection point plug on the second end.

20 Claims, 9 Drawing Sheets

170

| PIN NUMBER | SIGNAL DESCRIPTION |
|---|---|
| 1 | POWER BUTTON |
| 2 | GROUND |
| 3 | POWER BUTTON LED BLUE |
| 4 | VCC +5V |
| 5 | POWER BUTTON LED AMBER |

CONNECTS TO CARD 136

CABLE OF X" LENGTH

142

| PIN NUMBER | SIGNAL DESCRIPTION |
|---|---|
| 1 | POWER BUTTON |
| 2 | GROUND |
| 3 | POWER BUTTON LED BLUE |
| 4 | CABLE DETECT |
| 5 | VCC +5V |
| 6 | POWER BUTTON LED AMBER |
| 7 | DIAGNOSTIC LED 3 |
| 8 | DIAGNOSTIC LED 4 |
| 9 | DIAGNOSTIC LED 1 |
| 10 | DIAGNOSTIC LED 2 |
| 11 | ETHERNET LED |
| 12 | WIRELESS LED |
| 13 | HDD LED |
| 14 | VCC +3V |

Fig. 3

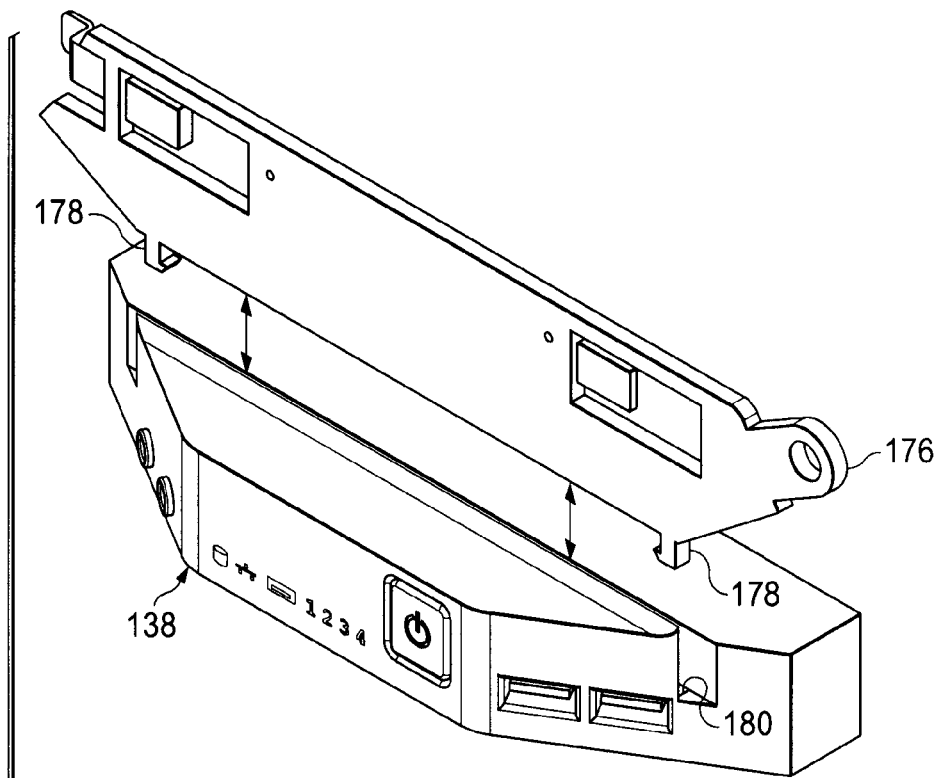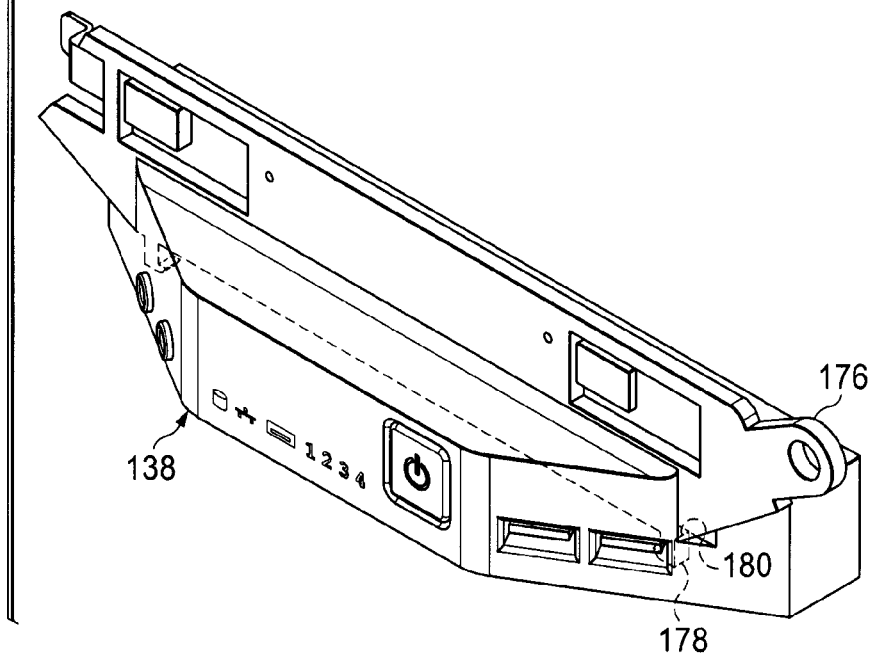
Fig. 7

INFORMATION HANDLING SYSTEM REMOTE INPUT/OUTPUT CONNECTION SYSTEM

BACKGROUND

The present disclosure relates generally to information handling systems (IHSs), and more particularly to a remote input/output connection system for an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs generally allow a user of the IHS to connect various input and/or output devices, such as a microphone, a set of headphones/speakers, a gaming controller, and any variety of input/output devices to the IHS for various functions. Connections for such devices are generally accomplished with special purpose plugs located somewhere on an outer shell of the IHS. Another type of dedicated input/output device for an IHS is an IHS power button. Pressing of the button to power the IHS on or off provides an input to the IHS. In return, an output of the IHS may provide power to an indicator light/light emitting diode (LED) on or near the power button to indicate that the IHS is powered on.

Desktop-type IHS users commonly place their systems under a desk or otherwise in an out-of-the way location that is not necessarily convenient to access. Thus, when plugging or unplugging input/output devices, the user has to bend down and reach under the desk (and possibly get caught up in a bundle of cables under the desk) to plug or unplug their input/output devices. In addition, to help conserve energy, it is becoming common to power off the IHS daily. Again, with the IHS located in an out of the way location, the user has to reach under the desk each time they want to turn the power to the IHS on or off. In addition to being an inconvenience, constantly performing awkward motions to reach the input/output plugs and/or the power button can cause ergonomic problems for the user. Non-ergonomic motions can cause detrimental long term health affects on the user.

Accordingly, it would be desirable to provide an improved remote input/output connection and power system for an IHS.

SUMMARY

According to one embodiment, an information handling system (IHS) remote input/output (I/O) connection system includes an enclosure having a power button, a communication bus connection point, and an audio connection point. A cable dongle extends from the enclosure. The cable dongle has a first end and a second end. The cable dongle also includes a connection from the power button on the enclosure on the first end to a communication connection point plug on the second end, which mates with a connection point plug on a remote I/O device card that enables a parallel (ACPI) S5-capable power button from the IHS to exist on the enclosure. The cable dongle further includes a communication cable coupled to the communication bus connection point on the first end and having a communication connection point plug on the second end. In addition, the cable dongle includes an audio cable coupled to the audio connection point on the first end and having an audio connection point plug on the second end.

BRIEF DESCRIPTION OF THE DRAWINGS

FIG. 3 illustrates an embodiment of a pin-out chart showing connections between a pass through connector that connects to the mother board and a remote I/O circuit device card.

FIG. 7 illustrates a perspective view of an embodiment of the remote I/O device box mating with a mounting bracket.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
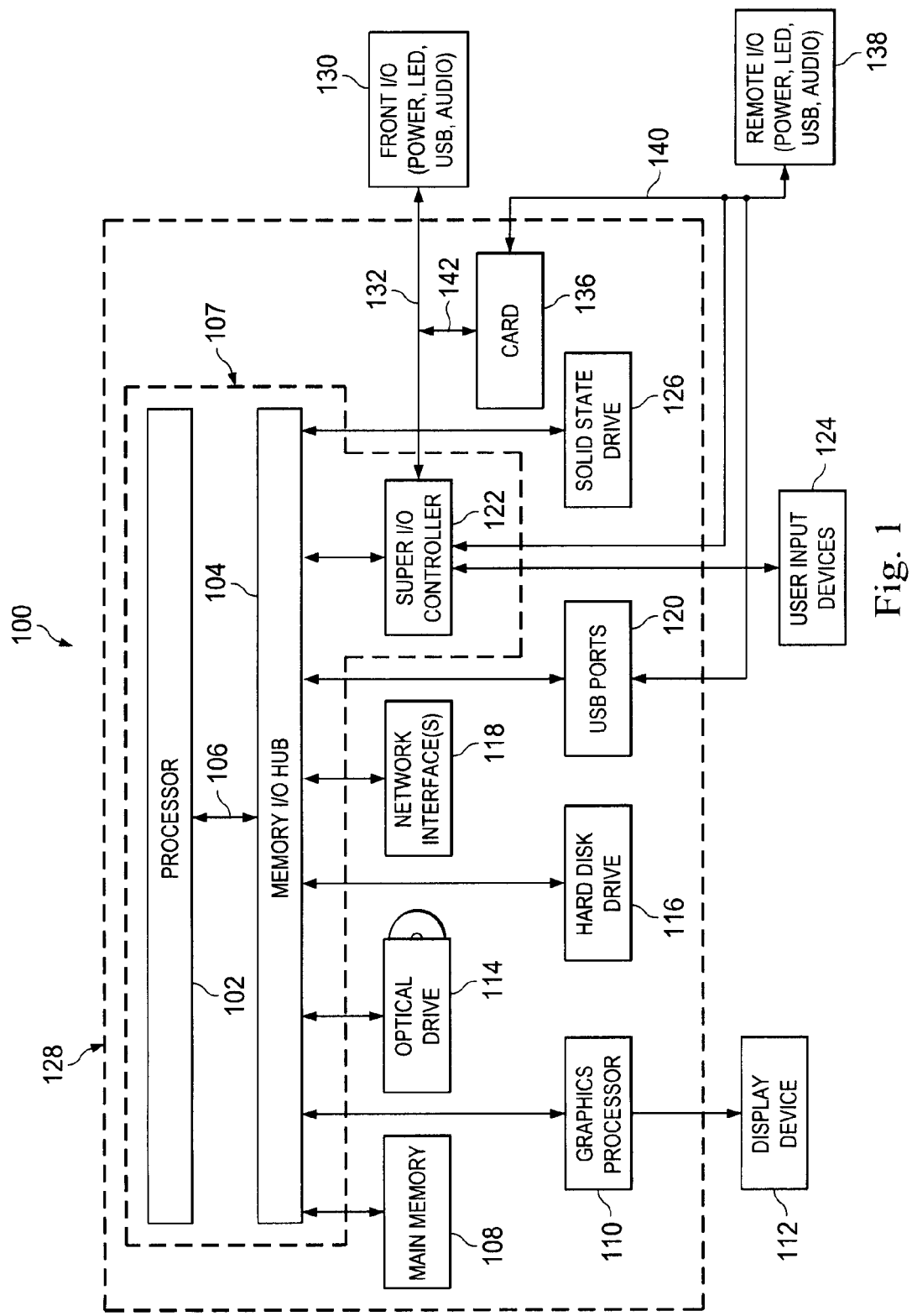
FIG. 1 illustrates a block diagram of an embodiment of an information handling system (IHS) according to the present disclosure.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. In an embodiment, the processor 102 and the memory I/O hub 104 are part of a system motherboard 107. Other components not shown here may also be included on the motherboard 107. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally within a chassis 128 of the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

A front panel of the IHS chassis 128 includes a plurality of front user input/output (I/O) devices 130 coupled to the motherboard 107 via a front I/O cable 132. In an embodiment, the user front panel I/O devices 130 include a power button, a light-emitting diode (LED) status indicator light, a headphone/speaker audio connection plug, a microphone plug, and/or a number of communication bus (e.g., universal serial bus (USB)) plugs. It should be understood that USB plugs which may be part of the front I/O devices 130 may be parallel to the USB ports 120, which may be located on a back panel of the IHS chassis 128.

Given that oftentimes IHS chassis 128 are located under desks, or at other out-of-the-way locations, it is difficult for a user to regularly access connection points of the front panel I/O devices 130 and also connection points for rear panel I/O devices, such as the USB Ports 120 and audio ports. Likewise, it is difficult for a user to access a power button for the IHS 100 and also to see any indicator LEDs associated on the front panel. Therefore, the IHS 100 is coupled to a remote I/O device box 138 via a remote I/O cable dongle 140, which a user can place at a more convenient location to access the power button, communication bus, audio plugs, and/or other features of the front panel I/O devices 130.

In an embodiment, the remote I/O device box 138 couples with the IHS 100 using the dongle 140, which in-turn, couples the power button of the remote I/O device 138 electrically parallel with the IHS chassis power button, which is part of the front panel devices 130, using a remote I/O circuit device card 136. The remote I/O card 136 may be added to any open card slot on the chassis 128 of the IHS 100. The dongle 140 is configured to communicatively/electrically couple the I/O devices of the remote I/O device 138 with respective ports on the IHS 100 to provide the relevant functionality. For example, the dongle 140 may couple the power button of the remote I/O box 138 to the remote I/O card 136 to allow the IHS 100 to be powered up and down using the remote power button on the remote I/O device 138. Additionally, the dongle 140 may couple a communication connection point (e.g., a USB plug) on the remote I/O device 138 to a communication connection point (e.g., USB port 120) at the IHS 100, such as on a back panel of the IHS chassis 128. Furthermore, the dongle 140 may couple an audio connection point (e.g., a headphone/speaker plug, and/or a microphone plug) on the remote I/O device 138 to a corresponding audio connection point at the IHS 100, such as on a back panel of the IHS chassis 128.

In other words, an embodiment of the present disclosure provides a small and portable module (e.g., the remote I/O device box 138) that includes multiple connector plugs such as a headphone jack, a microphone jack, and a true advanced configuration and power interface (ACPI) S5-capable power button. Signals for these functions are ganged together and exit the module in a dongle cable assembly (e.g., dongle 140). At the opposite end of this dongle, these signals fan out into discrete communication (e.g., USB) and audio connectors to connect to existing ports on the rear I/O panel of the IHS chassis 128. A power button cable portion of the dongle 140 connects a power button on the remote I/O device 138 to a remote I/O option card (e.g. remote I/O circuit device card 136) that connects the power button signaling from an existing IHS front panel power button to the motherboard 107 via the front I/O cable 132.

In an embodiment, The remote I/O circuit device card 136 does not utilize a conventional peripheral component interconnect (PCI)/PCI express (PCIe) bus. Therefore, the card 136 may be placed in any open expansion slot on the chassis 128. In an embodiment, a small printed circuit board (PCB) on the card 136 is connected in parallel with the system motherboard 107 such that it intercepts the power button signal using a pass through plug 142, without affecting normal operation of the existing system front panel devices 130. As should be understood, a unique PCB and cable can be used for any IHS to match the connector type and length that IHS uses to couple the front I/O cable 132 to the motherboard 107.

Figure 2:
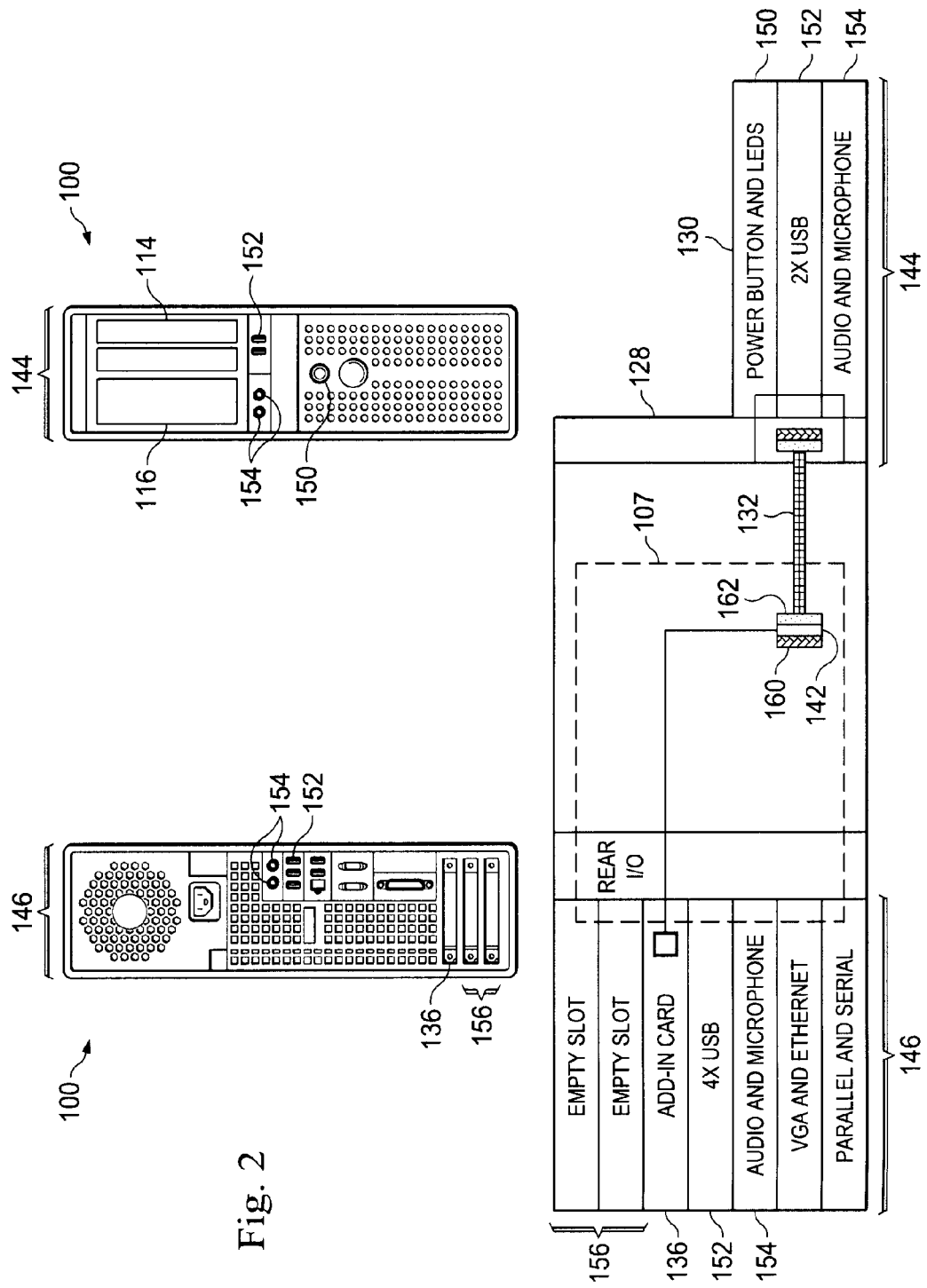
FIG. 2 illustrates a perspective view of an embodiment of front and rear panels for the IHS and a block diagram of connections to a motherboard for the IHS.

FIG. 2 illustrates a perspective view of an embodiment of a front panel 144 and a rear panel 146 for the IHS 100 and a block diagram of connections to the motherboard 107. The front panel view of the IHS 100 shows a front panel 144 having an optical drive 114, a hard disk drive 116, a power button/LED 150, a number of communication bus connection points 152 (e.g., USB plugs), and a number of audio connection points 154 (e.g., a headphone/speaker plug and a microphone plug). The rear panel view of the IHS 100 shows a rear panel 146 having, among other features, a number of communication bus connection points 152, a number of audio connection points 154, a remote I/O circuit device card 136 in an expansion slot, and a number of extra expansion slots 156. The remote I/O circuit device card includes a metal bracket similar to that of conventional expansion cards and mounts to the expansion slots in a conventional manner. The communication bus connection points 152 on the front panel 144 and the communication bus connection points 152 on the rear panel 146 are substantially similar. Additionally, the audio connection points 154 on the front panel 144 and the audio connection points 154 on the rear panel 146 are substantially similar, with the exception that each panel 144, 146 may include a headphone/speaker plug and a microphone plug. It is noted that the communication bus connection points 152 may be substantially similar to the USB ports 120 shown in FIG. 1.

The block diagram of FIG. 2 illustrates an embodiment of connections between front panel 144 devices (e.g., the front panel devices 130 (including power button/LED 150, communication bus connection points 152, and audio connection points 154)), the motherboard 107, and the remote I/O circuit device card 136. As shown, the motherboard 107 includes a front I/O plug 160 configured to receive and mate with a front I/O cable plug 162 from the front I/O cable 132, thereby enabling the front panel I/O devices 130 to communicate with the motherboard 107. The type, style and number of pins for the plugs 160 and 162 may vary, so long as the two mate together and allow communications to pass to desired points in the IHS 100. To utilize a remote I/O device 138 of the present disclosure, a pass through plug 142 may be used to couple between the plugs 160 and 162. Like the plugs 160 and 162, the type, style and number of pins for the plug 142 may vary, so long as the two plugs 160 and 162 can mate together with this plug 142 and allow communications to pass to desired points in the IHS 100. In addition, the plug 142 includes a conductor that taps into the pins of the plugs 142, 160 and 162 that pass power between the motherboard 107 and the power button/LED 150. It is noted that the dongle 140 from the remote I/O device 138 connects to the remote I/O circuit device card 136. As such, when the power button on the remote I/O device 138 is pressed, the mother board 107 receives the signal and reacts just as if the power button 150 on the front panel 144 is pressed. Thus, when connected, pressing either the power button 150 on the front panel 144 or pressing the power button 150 on the remote I/O device 138 can provide a true ACPI S5 power button function to toggle the IHS on and off. In other words, the remote I/O pass through connector plug 142 and remote I/O circuit device card 136 will pass through all signals from the motherboard front I/O connector plug 160 to the front I/O cable 132 and it will not change the functionality or features of the front I/O devices 130, and it will connect the power button/LED 150 signals to the remote I/O circuit device card 136 via a wire cable. Any length of the cable is acceptable as the cable is capable of passing communications with very little signal loss.

FIG. 3 illustrates an embodiment of a pin-out chart 170 showing connections between the pass through connector 142 that connects to the connectors 160 and 162 on one end and the remote I/O circuit device card 136 on the other end. The pin out diagram is the same for the motherboard plug 160 and the front I/O cable plug 162. In an embodiment, the cable connects the power button pins (1-1), the electrical ground (GND) pins (2-2), the power button LED blue pins (3-3), the VCC +5V pins (5-4), and the power button LED amber (6-5) pins together. However, it is noted that other pin combinations may be used with the present disclosure to provide the desired functionality. As can be seen, Passing through functionality to the front I/O devices 130 while breaking out feature enabling signals is independent of the motherboard pin out and signal descriptions, which can change from generation to generation of IHSs.

Figure 4:
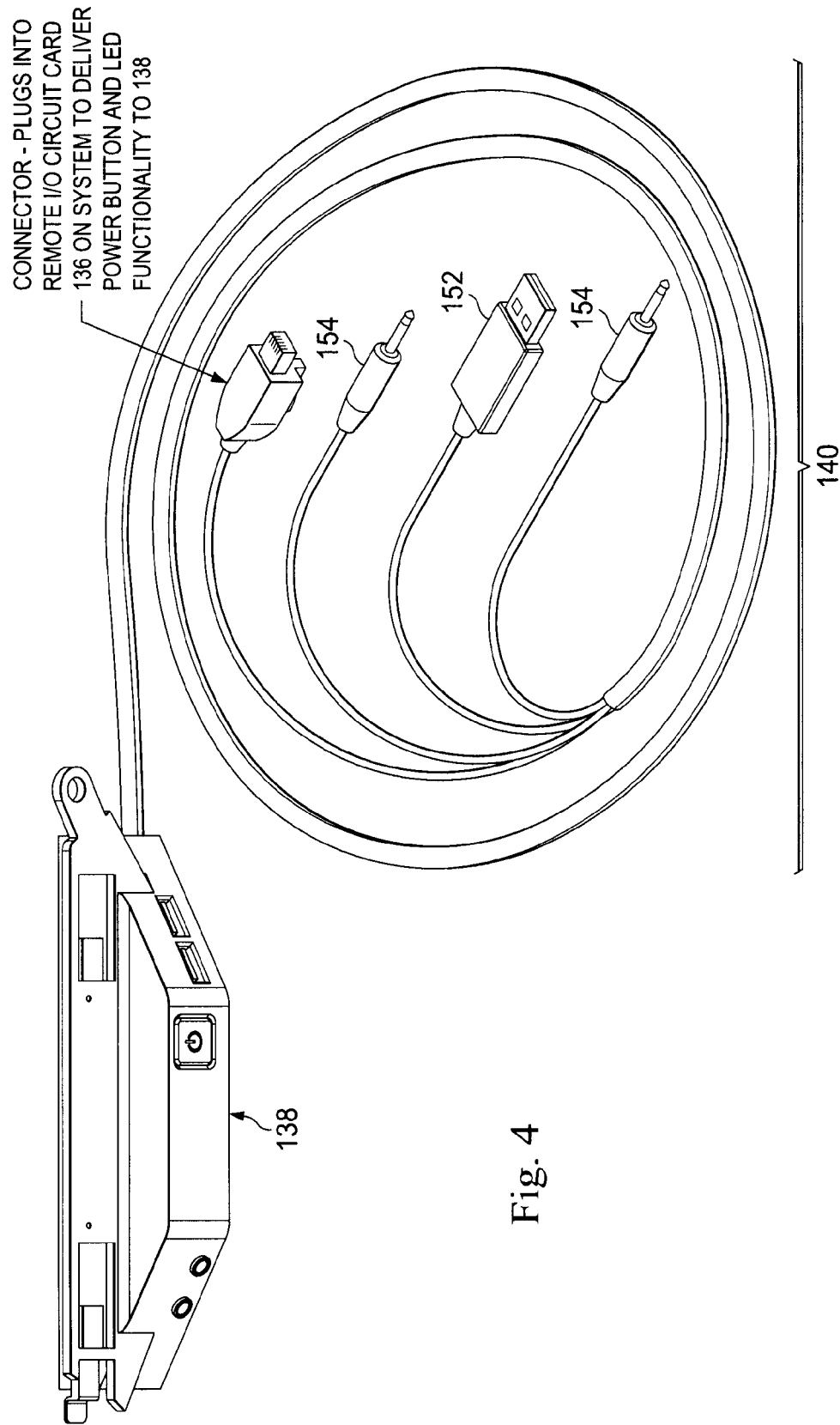
FIG. 4 illustrates a perspective view of an embodiment of the remote I/O cable dongle extending from an embodiment of the remote I/O device box.

FIG. 4 illustrates a perspective view of an embodiment of the remote I/O cable dongle 140 extending from an embodiment of the remote I/O device box 138. The dongle 140 includes connector cables (e.g., copper or aluminum wires) that connect to features of the remote I/O device 138. In an embodiment, the dongle includes connector cables coupled to the power button/LEDs 150, the communication bus connection points 152, and the audio connection points 154. A length and configuration of the dongle 140 may change as desired.

Figure 5:
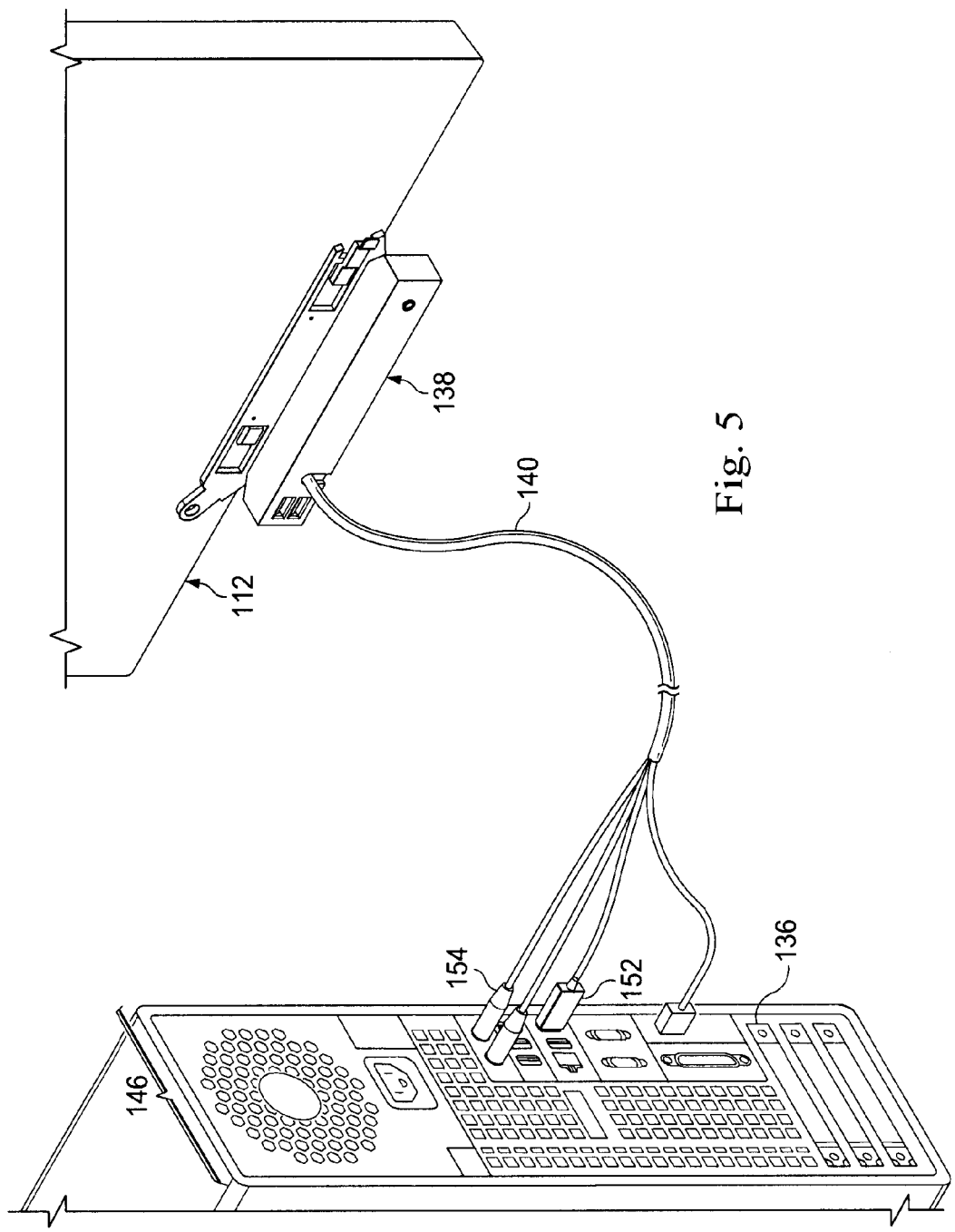
FIG. 5 illustrates a perspective view of an embodiment of a remote I/O cable/dongle coupling a remote I/O device box to a rear panel of the IHS.

FIG. 5 illustrates a perspective view of an embodiment of a remote I/O cable/dongle 140 coupling a remote I/O device box 138 to a rear panel 146 of the IHS 100. In this embodiment, the remote I/O device 138 is mounted to a lower portion of a display device 112. As such, the features of the remote I/O device 138 are easily accessible by a user of the IHS 100, even if the IHS chassis 128 is located under a desk or other out-of-the-way location. The dongle 140 includes connector cables (e.g., copper or aluminum wires) that connect features of the remote I/O device 138 (e.g., the power button/LEDs 150, the communication bus connection points 152, and the audio connection points 154) to respective points (e.g., the remote I/O circuit device card 136, the communication bus connection points 152 and the audio connection points 154) on the rear panel 146.

Figure 6:
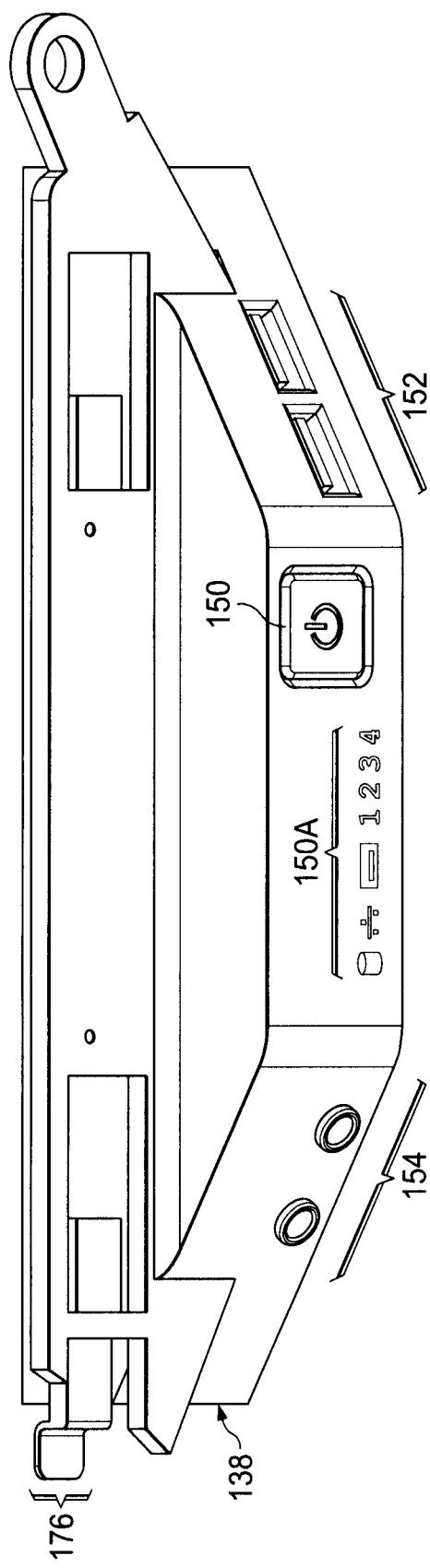
FIG. 6 illustrates a perspective view of an embodiment of the remote I/O device box.

FIG. 6 illustrates a perspective view of an embodiment of the remote I/O device box 138. As can be seen, the remote I/O device 138 has an enclosure having a plurality of user I/O devices including a power button 150, power button indicator LEDs 150A, communication bus connection points (e.g., USB plugs), and audio connection points (e.g., headphone/speaker plug and microphone plug). Other features may be added to the remote I/O device 138. The enclosure for the remote I/O device 138 may be constructed from metal, plastic, combinations of metal and plastic, and/or other suitable materials. In an embodiment, the remote I/O device 138 has angled sides such that when user cables are plugged in to the plugs (152 and/or 154) the cables extend out and away from in front of the remote I/O device 138. Thus, the user cables are not extending right to the user and are thus, generally out of the user's way. In an embodiment, the remote I/O device 138 couples with a mounting bracket 176, that allows the device 138 attached to some structure on which the mounting bracket 176 is attached, such as to a surface below a display screen on the display device 112 (See FIGS. 7 and 9).

FIG. 7 illustrates a perspective view of an embodiment of the remote I/O device box 138 mating with a mounting bracket 176. The mounting bracket 176 may be formed from metal, plastic, and/or other materials. The mounting bracket 176 includes tabs 178 that are configured to removeably mate with and snap into mounting sockets 180 on the remote I/O device 138 enclosure. An upper portion of the bracket 176 has holes, tabs, and other features, which allow the mounting bracket to be mounted to desired surfaces. In an embodiment, the mounting bracket 176 is also configured to mate with an IHS speaker set (not shown) and mount to a display device 112.

Figure 8:
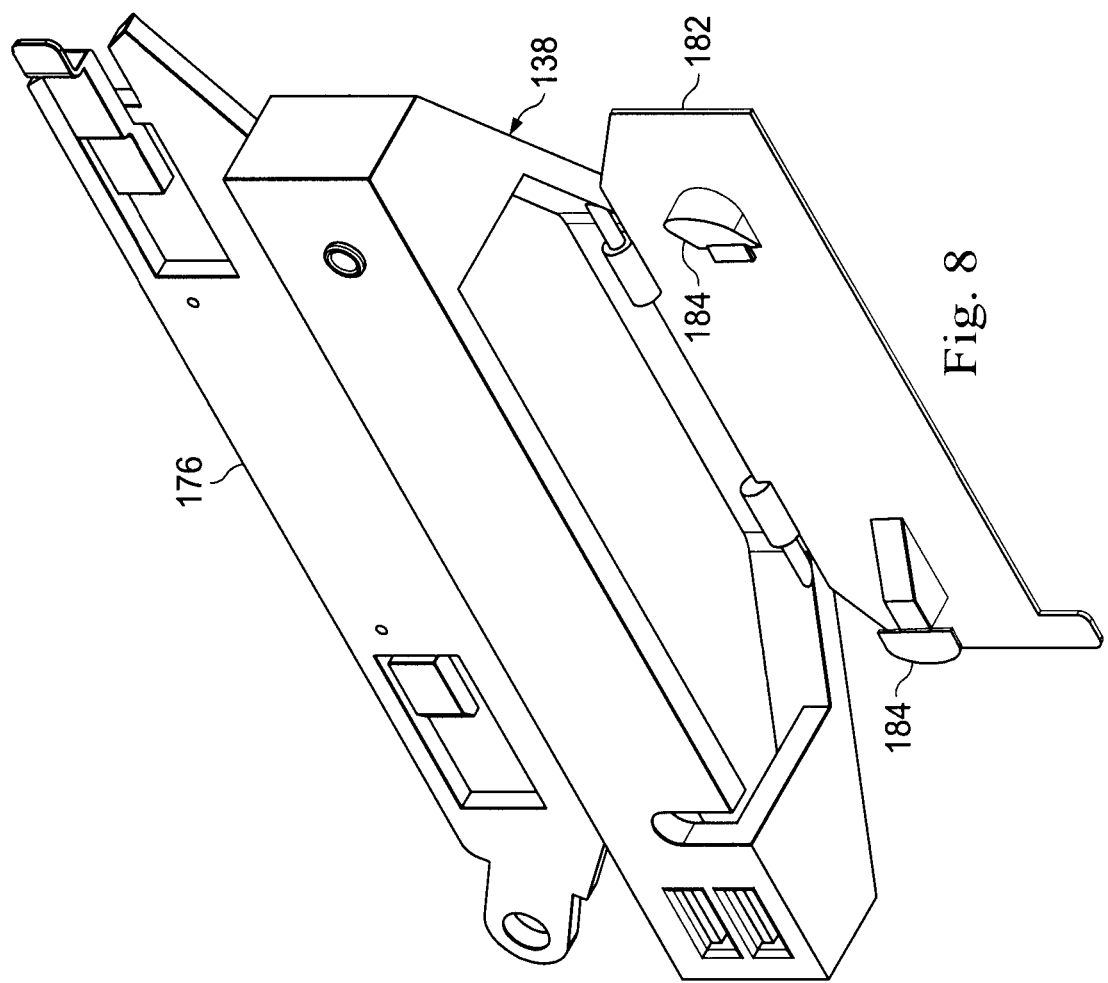
FIG. 8 illustrates a perspective view of an embodiment of the remote I/O circuit device having a cable wrapping prongs.

FIG. 8 illustrates a perspective view of an embodiment of the remote I/O circuit device 138 having a hinged door 182 that opens and allows access to an inner portion of the enclosure. In an embodiment, the door 182 includes a set of cable wrapping prongs 184 that allow excess cable (e.g., from the dongle 140) to be wrapped around the prongs 184 and closed into the enclosure of the remote I/O device 138 and out of the way. The door 182 and/or the prongs 184 may be formed from metal, plastic, and/or other materials. The prongs 184 should be formed with edges that will not cut into an insulative coating on the cables of the dongle 140. The door 182 may include a latch allowing the door 182 to close and stay closed as desired.

Figure 9:
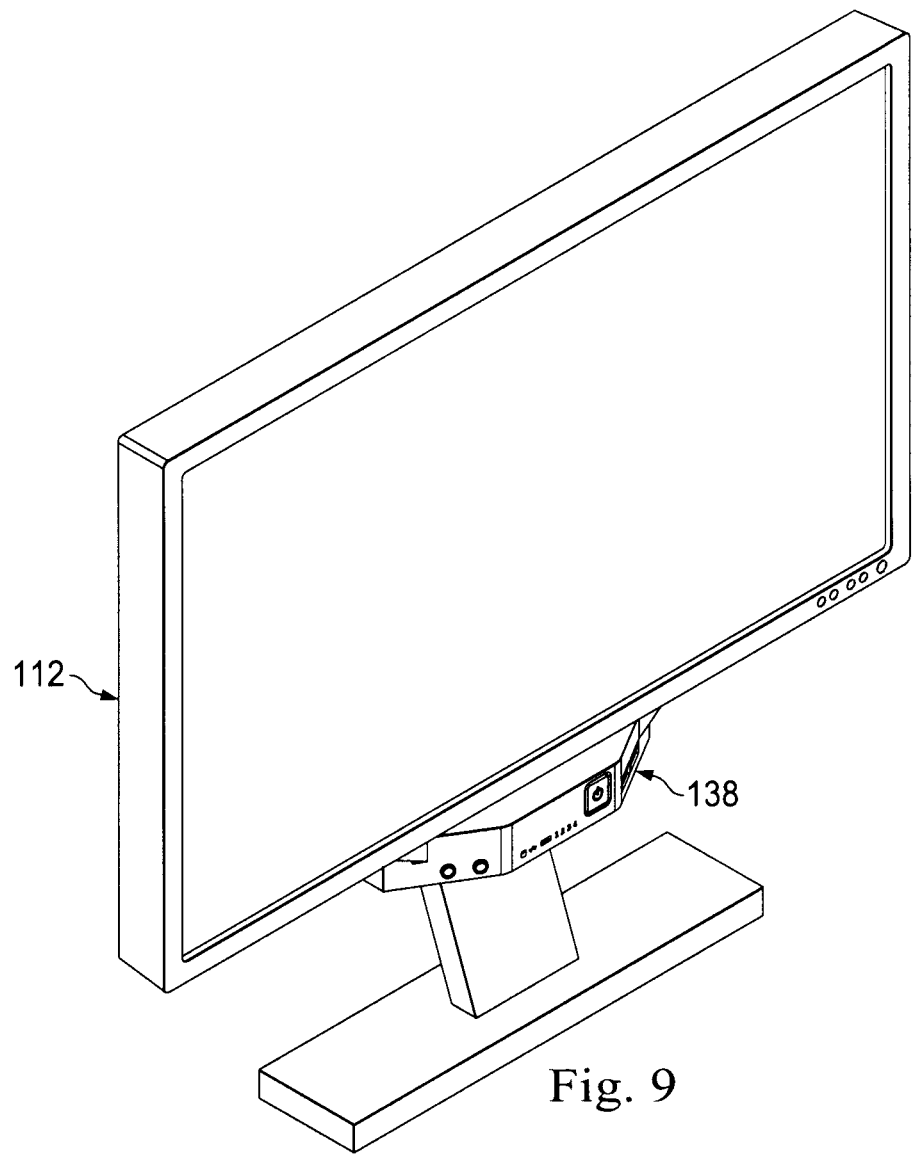
FIG. 9 illustrates a perspective view of an embodiment of the remote I/O circuit device mounted on an IHS display device.

FIG. 9 illustrates a perspective view of an embodiment of the remote I/O circuit device 138 mounted on an IHS display device 112. Using the mounting bracket 176 discussed with reference to FIG. 7, the remote I/O circuit device 138 can mount to an under side of a display screen of a display device 112. However, it is noted that the remote I/O circuit device 138 may also mount to other surfaces or may not mount to anything and may sit on a surface.

As should be understood, there are a many of potential mechanical implementations for this features described in the present disclosure. For example, as described, the remote I/O device 138 may be designed to mount onto the underside of a display device (e.g., 112), using the same attachment features as may be used for an IHS display device speaker bar. Conventional display devices may include mating features for such mounting. The installation may thus be performed using a simple snapping motion by snapping the mounting tabs 178 into mounting sockets 180. This mounting feature can also be removable for the user to place on their desk or at another convenient location. In addition, other implementations can incorporate mechanical features that help with the user's cable management. Features like the ones seen in FIG. 8 can be incorporated on the rear of the remote I/O device 138 to hide the additional cable length.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) remote input/output (I/O) system, comprising:
   a remote I/O chassis, the remote I/O chassis including:
      a power button;
      a communication bus connection point; and
      an audio connection point; and
   a flextible, elongated cable enclosure extending from the remote I/O chassis and including a distal end, the cable enclosure housing each of:
      a power cable that is coupled to the power button and that includes a power cable plug that is located adjacent the distal end of the cable enclosure and that couples to a remote I/O card, wherein the remote I/O card is connected to a pass through plug that is configured to couple between a motherboard I/O plug and an I/O cable plug that provides signals to the motherboard I/O plug from an IHS chassis power button on a desktop IHS chassis;
      a communication cable that is coupled to the communication bus connection point and that includes a communication connection point plug that is located adjacent the distal end of the cable enclosure and that couples to a communication bus connection on the desktop IHS chassis; and
      an audio cable that is coupled to the audio connection point and that includes an audio connection point plug that is located adjacent the distal end of the cable enclosure and that couples to an audio connection on the desktop IHS chassis.

2. The system of claim 1, wherein the remote I/O card is configured to couple to any of a plurality of expansion slots in the desktop IHS chassis.

3. The system of claim 1, wherein the communication bus connection point is configured to mate to a universal serial bus (USB) device.

4. The system of claim 1, further comprising a second audio connection point on the remote I/O chassis and a second audio cable housed in the cable enclosure, wherein the second audio cable is coupled to the second audio connection point and includes a second audio connection point plug that is located adjacent the distal end of the cable enclosure and that couples to a second audio connection on the desktop IHS chassis.

5. The system of claim 1, wherein the remote I/O chassis is configured to removeably mount to a display device.

6. The system of claim 1, wherein the remote I/O chassis defines a cable enclosure housing and includes a set of cable wrap lugs located adjacent the cable enclosure housing that are configured to receive an excess length of the cable enclosure and store the excess length of the cable enclosure in the cable enclosure housing.

7. The system of claim 1, wherein the power button provides an advanced configuration and power interface (ACPI) S5 off state function to an IHS housed in the desktop IHS chassis through the remote I/O card and the connection of the pass through plug between the motherboard I/O plug and the I/O cable plug.

8. An information handling system (IHS), comprising:
   a desktop IHS chassis including:
      a processor housed in the desktop IHS chassis;
      a memory housed in the desktop IHS chassis and coupled to the processor;
      an IHS power button located on the desktop IHS chassis;
      a IHS communication bus connection located on the desktop IHS chassis; and
      an IHS audio connection located on the desktop IHS chassis; and
   a remote input/output (I/O) system coupled to the desktop IHS chassis, the remote I/O system; comprising:
      remote I/O chassis, the remote I/O chassis including:
         a remote I/O power button;
         a remote I/O communication bus connection point; and
         remote I/O audio connection point; and
      a flexible, elongated cable enclosure extending from the remote I/O chassis and including a distal end, the cable enclosure housing each of:
         a power cable that is coupled to the remote I/O power button and that includes a power cable plug that is located adjacent the distal end of the cable enclosure and that is coupled to a remote I/O card housed in the desktop IHS chassis, wherein the remote I/O card is connected to a pass through plug that is coupled between a motherboard I/O plug and an I/O cable plug that provides signals to the motherboard I/O plug from the IHS power button;
         a communication cable that is coupled to the remote I/O communication bus connection point and that includes a communication connection point plug that is located adjacent the distal end of the cable enclosure and that is coupled to the IHS communication bus connection; and
         an audio cable that is coupled to the remote I/O audio connection point and that includes an audio connection point plug that is located on the distal end of the cable enclosure and that is coupled to the IHS audio connection.

9. The IHS of claim 8, wherein the remote I/O card is configured to couple to any of a plurality of expansion slots in the desktop IHS chassis.

10. The IHS of claim 8, wherein the remote I/O communication bus connection point is configured to mate to a universal serial bus (USB) device.

11. The IHS of claim 8, further comprising a second remote I/O audio connection point on the remote IHS chassis and a second audio cable housed in the cable enclosure, wherein the second audio cable is coupled to the second remote I/O audio connection point and includes a second audio connection point plug that is located adjacent the distal end of the cable enclosure and that is coupled to a second IHS audio connection on the desktop IHS chassis.

12. The IHS of claim 8, wherein the remote I/O chassis is configured to removeably mount to a display device that is couple to the processor.

13. The IHS of claim 8, wherein the remote IO chassis defines a cable enclosure housing and includes a set of cable wrap lugs located adjacent the cable enclosure housing that are configured to receive an excess length of the cable enclosure and store the excess length of the cable enclosure in the cable enclosure housing.

14. The IHS of claim 8, wherein the remote I/O power button provides an advanced configuration and power interface (ACPI) S5 off state function to an IHS housed in the desktop IHS chassis through the remote I/O card and the connection of the pass through plug between the motherboard I/O plug and the I/O cable plug.

15. A method of providing remote inputs and outputs (I/O) to an information handling system (IHS), the method comprising:
   providing a desktop IHS chassis including an IHS power button, and IHS communications bus connection, and an IHS audio connection;
   coupling a remote I/O card to an expansion slot in the desktop IHS chassis, wherein the remote I/O card includes a pass through plug that is coupled between a motherboard I/O plug and an I/O cable plug that provides signals to the motherboard I/O plug from the IHS power button;
   providing a remote I/O chassis that includes a remote I/O power button, a remote I/O communication bus connection point, an audio connection point;
   coupling the remote I/O chassis to the desktop IHS by:
      coupling the remote I/O power button to the remote I/O card using a power cable that is housed in a flexible, elongated cable enclosure;
      coupling the remote I/O communication bus connection point to the IHS communication bus connection on the IHS using a communication cable that is housed in the flexible, elongated cable enclosure; and
      coupling the remote I/O audio connection point to the IHS audio connection point using an audio cable that is housed in the flexible, elongated cable enclosure; and
   receiving a power button signal from the remote I/O power button and transferring the power button signal to a power circuit on a motherboard of the desktop IHS through the power cable, the remote I/O card, the pass through plug, and the motherboard I/O plug.

16. The method of claim 15, wherein the IHS communication bus connection is a universal serial bus (USB) connection.

17. The method of claim 15, further comprising:
   coupling a second remote I/O audio connection point on the remote I/O chassis to a second IHS audio connection point on the desktop IHS chassis using a second audio cable that is housed in the flexible, elongated cable enclosure.

18. The method of claim 15, further comprising:
   removeably mounting the remote I/O chassis to a display device.

19. The method of claim 15, wherein the transferring the power button signal to the power circuit on the motherboard of the desktop IHS includes providing an advanced configuration and power interface (ACPI) S5 off state function to the IHS.

20. The method of claim 15, further comprising:
   uncoupling a front I/O cable that includes the I/O cable plug from the motherboard I/O plug and coupling the pass through plug between the I/O cable plug and the motherboard I/O plug.

\* \* \* \* \*